Oct. 3, 1967 J. A. DAHLGREN 3,344,776
STEAM GENERATOR ARRANGEMENT HEATED BY REACTOR
WATER FROM A NUCLEAR REACTOR
Filed July 6, 1965
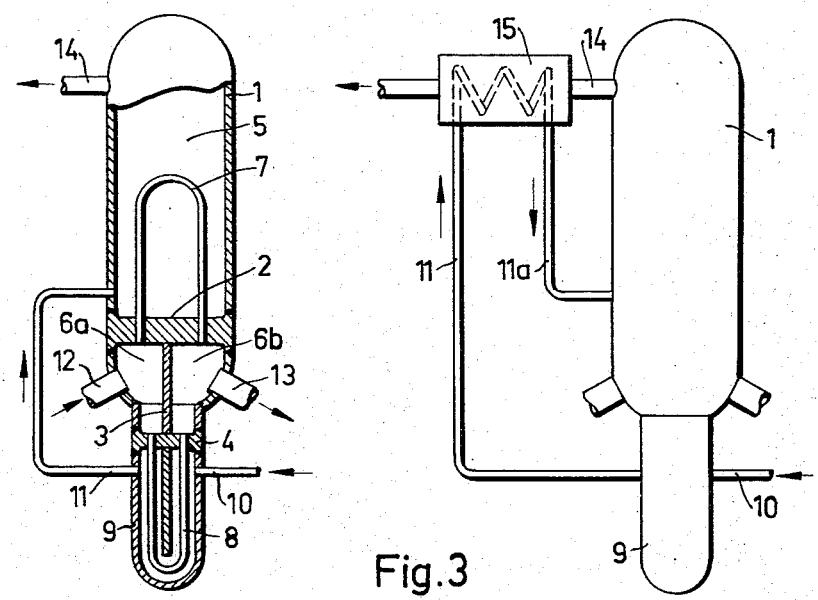
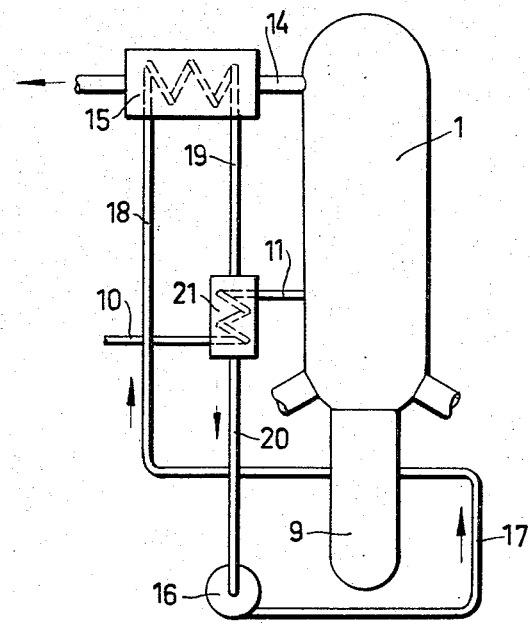

United States Patent Office 3,344,776
Patented Oct. 3, 1967

3,344,776
STEAM GENERATOR ARRANGEMENT HEATED BY REACTOR WATER FROM A NUCLEAR REACTOR
Jöns Arthur Dahlgren, Saltsjobaden, Sweden, assignor to AB Rosenblads Patenter, Stockholm, Sweden
Filed July 6, 1965, Ser. No. 469,481
Claims priority, application Sweden, Oct. 14, 1964, 12,314/64
1 Claim. (Cl. 122—32)

The present invention refers to steam generators to be heated by reactor water from a nuclear reactor, which steam generator comprises a vertical vessel, which is divided by partition walls into a boiling space and thereunder an inlet chamber and an outlet chamber for the reactor water which chambers communicate with each other via a pipe line system, which forms a heating element, below termed "main heating element," in said boiling space.

It is an object of the invention to provide a heater, apart from said boiling space, which heater will receive part of the reactor water to the steam generator as heating medium with elimination of additional pipe lines or distribution spaces to pass that reactor water to and from said heater.

According to the invention this is accomplished through the arrangement that said inlet chamber and outlet chamber for the reactor water also communicate with each other via another pipe line system, which forms an additional heating element in a heating space confined in a heater, which heater is attached directly to the steam generator beneath said chambers forming with that generator a single vessel unit.

The invention shall be more closely explained with reference to the annexed drawing in which—

FIG. 1 illustrates a shape of steam generator according to the invention in side section and FIGS. 2 and 3 each illustrates an example of a modified form of the steam generator shown in FIG. 1.

All figures are schematic and only intended to serve as examples without limiting effect. Corresponding parts are in the several figures designated by the same reference characters.

In FIG. 1 the vessel 1 is divided by an upper tube wall 2 and a partition wall 3 over a lower tube wall 4 into a boiling space 5 and in- and outlet chambers 6a and 6b, respectively, which chambers communicate with each other on the one hand via a first bundle of tubes 7 (indicated by one tube only), which forms a main heating element in the boiling space and on the other hand via a second bundle of tubes 8 (indicated in the same way), which forms an additional heating element in a heating space of a heater 9, which is directly connected under the lower tube wall 4. Feed water is supplied to the boiling space via said heater through lines 10 and 11. The reactor water is passed to and from the steam generator, from and to the reactor, not shown in the figure, through lines 12 and 13, respectively. The steam generated in boiling space 5 is discharged through a line 14.

Disregarding the heater 9 with said second heating element this device represents a known type of steam generator, which in an atomic power plant usually is utilized in the way that the steam through line 14 is passed as power steam to a turbo generator plant from which it, in condensed state, is returned as feed water to the steam generator. Usually the steam is thereby generated at very high pressure coresponding to a boiling temperature which considerably exceeds the highest temperature to which the condensate feed water may be reheated in the turbo generator plant. For instance, the steam properties may be 70 ata. 285° C., while the feed water may be reheated in said plant to a temperature not in excess of 230° C. Thus, if the feed water is supplied to the boiling space 5 at a temperature of about 230° C., 15% of the heat supplied by the bundle of tubes 7 will be consumed for heating, only 85% being left for evaporation and said bundle must be dimensioned with regard thereto. Especially, for steam generators of the kind and for the purpose in question, this is considerably unfavourable as all possibilities to limit the size of this tube bundle should be utilized. Thus, because of the high operating pressure the size of the tube wall 2 and thereby also the number of tubes should be limited and, because of the large flow of reactor water, also the length of these tubes should be limited in order to avoid a too large drop of pressure. In addition it is of interest that these parts, which enclose the reactor water, should be limited in size, as from the point of view of security they have to be made from expensive material by expensive manufacturing methods. This is valid also for all external pipes for the reactor water.

As is known, however, instead of permitting the heating medium to supply heat for the heating, as well as for the evaporation stage in the boiling space, it is possible to effect the heating to boiling temperature in a separate heater, before the feed water is supplied to the boiling space, and thereby making possible not only that the heating surface in the boiling space may be reduced to a minimum, but in addition, that this reduction becomes larger than the additional heating surface in the separate heater. This is due to the fact that the heating may be accomplished in a separate heater, which the feed water enters at a relatively low temperature, wherein there obtains a higher temperature difference than that in the boiling space, where the feed water as it enters this space immediately will get a higher temperature as it mixes with the water therein.

The reactor water as heating medium, however, causes special apparatus technical problems primarily due to the economic necessity to limit the extension of the pipe system and the size of all spaces filled by the reactor water. Limiting the size of the space filled by reactor water is especially critical by reason of the high costs in case of heavy water in these spaces. The building together of heater and steam generator according to the invention meets high demands in that respect, as the need of separate pipe lines for the reactor water to and from the heater as well as separate distribution chambers for that water in the heater is eliminated. The reactor water supplied through line 12 is distributed by the shortest possible route in the inlet chamber 6a to the tube bundles 7 and 8 and is withdrawn through line 13 collected in the outlet chamber 6b. The two tube bundles 7 and 8 are so proportioned in relation to each other that the distribution makes it possible for them to fulfill their respective purposes, namely, the bundle 7 to evaporate the feed water, supplied through line 11, and the bundle 8 to heat that feed water, supplied through line 10, to a temperature close to the evaporation temperature in the boiling space 5 possible with heat in excess therefore so that a partial evaporation will take place.

With such excess heat and heating under higher pressure than in the boiling space, it is also possible to heat the feed water to higher temperature than the evaporation temperature, and to allow it to emit that excess heat in some other heat exchanger on its way to the boiling space. FIG. 2 illustrates such a case in which the feed water, heated under higher pressure, is passed through line 11 to a superheater 15 for the generated steam where, under the same pressure, it delivers its excess heat before it is passed through line 11a to the boiling space. With that arrangement the feeding pressure of course must be increased to said higher pressure.

This disadvantage may be eliminated by an arrangement such as illustrated in FIG. 3. Here the heater 9 is utilized for the heating of an auxiliary liquid, other than the feed water, which is circulated under pressure by means of a circulation pump 16 via lines 17, 18, 19, and 20 in succession through the heater 9, the superheater 15 and a feed water preheater 21, through which the feed water is supplied to the boiling space via lines 10 and 11 instead of through the heater 9.

The auxiliary liquid is thereby heated in the heater 9 so that it becomes possible to cause the steam to be superheated as well as the feed water to be preheated to the evaporation temperature in the boiling space. Thus the feeding pressure may be limited to the pressure in the boiling space and the pressure in the circulation system, i.e. the pressure in heater 9 has no influence on the pumping energy.

For these and other heat systems, which have such connection with the steam generator that the reactor water forms the primary source of heat for the system the invention of course is of the same importance as for the simple feed water heating according to FIG. 1.

What I claim is:

A steam generator- and heater-unit to be heated by hot reactor water of a nuclear reactor, comprising in combination a closed substantially vertical elongated pressure vessel of circular cross-section;
- an upper tube wall and a lower tube wall, extending substantially horizontally in said vessel in spaced relation;
- a substantially vertical partition wall therebetween, said tube walls and partition wall together dividing the inner space of said vessel into a steam generator space above the upper tube wall, a heater space beneath said lower tube wall and between said tube walls two header spaces one on each side of said partition wall;
- a first bundle of tubes, having a U-shape, in said steam generator space connected to said upper tube wall so as to form a communication between said two header spaces;
- a second bundle of tubes, having a U-shape, in said heater space and connected to said lower tube wall so as to form communications between said two header spaces;
- an inlet for reactor water to one of said header spaces;
- an outlet for reactor water from the other one of said header spaces;
- said steam generator space being provided with an inlet for liquid to be evaporated and an outlet for steam respectively; and
- said heater space being provided with an outlet and an outlet for liquid to be heated.

References Cited

UNITED STATES PATENTS

| | | | |
|---|---|---|---|
| 2,220,045 | 10/1940 | Kraft et al. | 122—32 |
| 3,141,445 | 7/1964 | Bell | 122—34 |
| 3,209,731 | 10/1965 | Schonberger et al. | 122—32 |

FOREIGN PATENTS

| | | |
|---|---|---|
| 841,800 | 7/1960 | Great Britain. |

KENNETH W. SPRAGUE, *Primary Examiner.*